United States Patent [19]

Kennelly

[11] Patent Number: 4,483,396

[45] Date of Patent: Nov. 20, 1984

[54] LANDFILL GAS WELL

[76] Inventor: James R. Kennelly, 3569 Cerritos Ave., Long Beach, Calif. 90807

[21] Appl. No.: 507,567

[22] Filed: Jun. 24, 1983

[51] Int. Cl.³ .............................................. E21B 43/08
[52] U.S. Cl. .................................. 166/242; 285/302; 166/236
[58] Field of Search ...................... 166/242, 227, 236; 285/298, 302; 175/321, 305

[56] References Cited

U.S. PATENT DOCUMENTS

| | | | |
|---|---|---|---|
| 615,767 | 12/1898 | Wade | 285/298 X |
| 982,836 | 1/1911 | Ley et al. | 285/302 |
| 1,191,886 | 7/1916 | Glauber | 285/302 X |
| 1,580,325 | 4/1926 | Perry | 285/302 |
| 3,399,548 | 9/1968 | Burns | 175/321 |

FOREIGN PATENT DOCUMENTS 1453480 9/1966 France .................................. 285/302

Primary Examiner—Stephen J. Novosad
Assistant Examiner—Michael Starinsky

[57] ABSTRACT

The gas well includes a plurality of generally tubular gas extracting means which extend from the ground surface downwardly, a lower interval of which means have longitudinally extending slots in the body wall through which gas may enter while the means lower end is closed. The slotted interval resides in the gas producing ground region. The extracting means two major parts are a lower part including the perforated interval which is of relatively larger diameter, and an upper part that extends outwardly of the ground plane and which is of smaller diameter. A transition joint interrelates the two diameter extracting means parts enabling the two parts to move longitudinally with respect to each other for accommodating ground subsidence in the gas producing region.

1 Claim, 2 Drawing Figures

LANDFILL GAS WELL

The present invention relates generally to a landfill gas well, and more particularly, to an improved gas well especially adapted for recovery of gas from a landfill site in that it automatically compensates for ground shift or subsidence or raising.

BACKGROUND OF THE INVENTION

It is well known that in most landfill, particularly those including a substantial portion of degradable refuse as part of the landfill material, there is a steady generation and accumulation of gases throughout the refuse-landfill material. Moreover, as time passes the mass of landfill material tend to deteriorate land shift downwardly causing a relatively continuous subsidence of the overall area and any equipment located therein.

All known attempts to develop a practical technique for reclaiming gases from fill areas have been plagued by the problem of sinking that results in damage or actual destruction of the reclaiming apparatus or associated surface based equipment. For example, where piping is inserted deeply into the filled areas subsidence of the lower strata can leave pipes and associated apparatus either totally or partially unsupported causing them to break or to be damaged to such an extent as to become inoperative.

SUMMARY OF THE INVENTION

A typical landfill area in which the gas well to be described herein is particularly advantageous includes from the soil top surface down, a relatively thin layer of cover soil, a substantial extent of fine soil backfill, a layer of sealing material and at the lower levels gravel backfill in which the gas to be reclaimed is extracted. The well consist collectively of a plurality of generally tubular gas extracting means to be described which extend from the surface downwardly through the various soil layers, a lower interval of which means includes a plurality of longitudinally extending slots through which gas may enter. The lower end of the pipe is closed. The slotted interval resides in the gravel backfill below the sealing material layer, the latter serving to insure that the gas in the gravel backfill can only be brought to the surface via the gas extracting means. The extracting means is separated into two major parts, the lower one including the perforated interval which is of relatively large diameter, and the upper part that extends outwardly of the topmost ground layer which is smaller in diameter. A transition joint interrelates the two diameter extracting means parts which enables the two parts to move longitudinally with respect to each other for accommodating subsidence of the lower situated fill material, or upward extension to increase the length of the well to accommodate additional landfilling.

DESCRIPTION OF A PREFERRED EMBODIMENT

Figure 1:
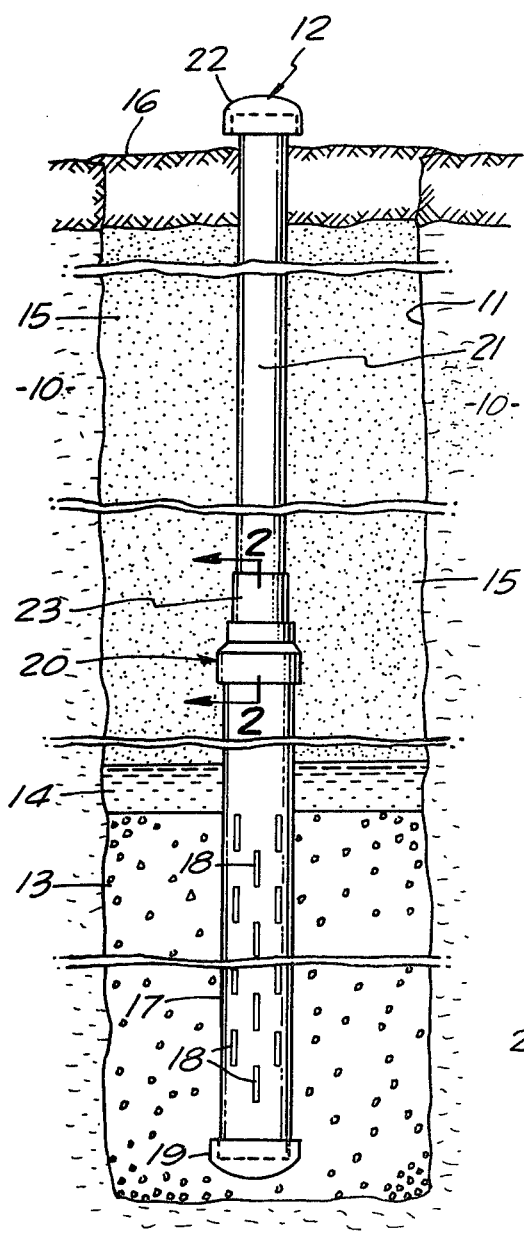
FIG. 1 is a side elevational, partially fragmentary and sectional view of a single gas extracting means shown operatively located at a well site.

With reference now to the drawing and particularly FIG. 1, a typical refuse fill ground region with which the present invention is especially advantageously employed for the removal of gas therefrom is identified generally as at 10. The refuse in 10 tends to subside at a discontinuous rate over the years and this produces a subsidence that can leave a well and associated apparatus unsupported resulting in its being damaged or destroyed. Moreover, it is the generation of gas within the refuse from decomposition of the various component fill materials that is reclaimed by the gas extracting means to be described.

Each well site consists of a vertical bore 11 extending to a substantial depth in the refuse and having a sectional diameter of approximately three feet. The vertical depth can vary anywhere from 35 to 150 feet. With a gas extracting device 12 centrally located within the site bore, a quantity of gravel 13 is added followed by a sealing layer 14, fine soil 15 and top soil 16. The sealing material prevents gas working its way upwardly outside the extracting means 12 into soil 15 which would result in gas being effectively lost.

Figure 2:
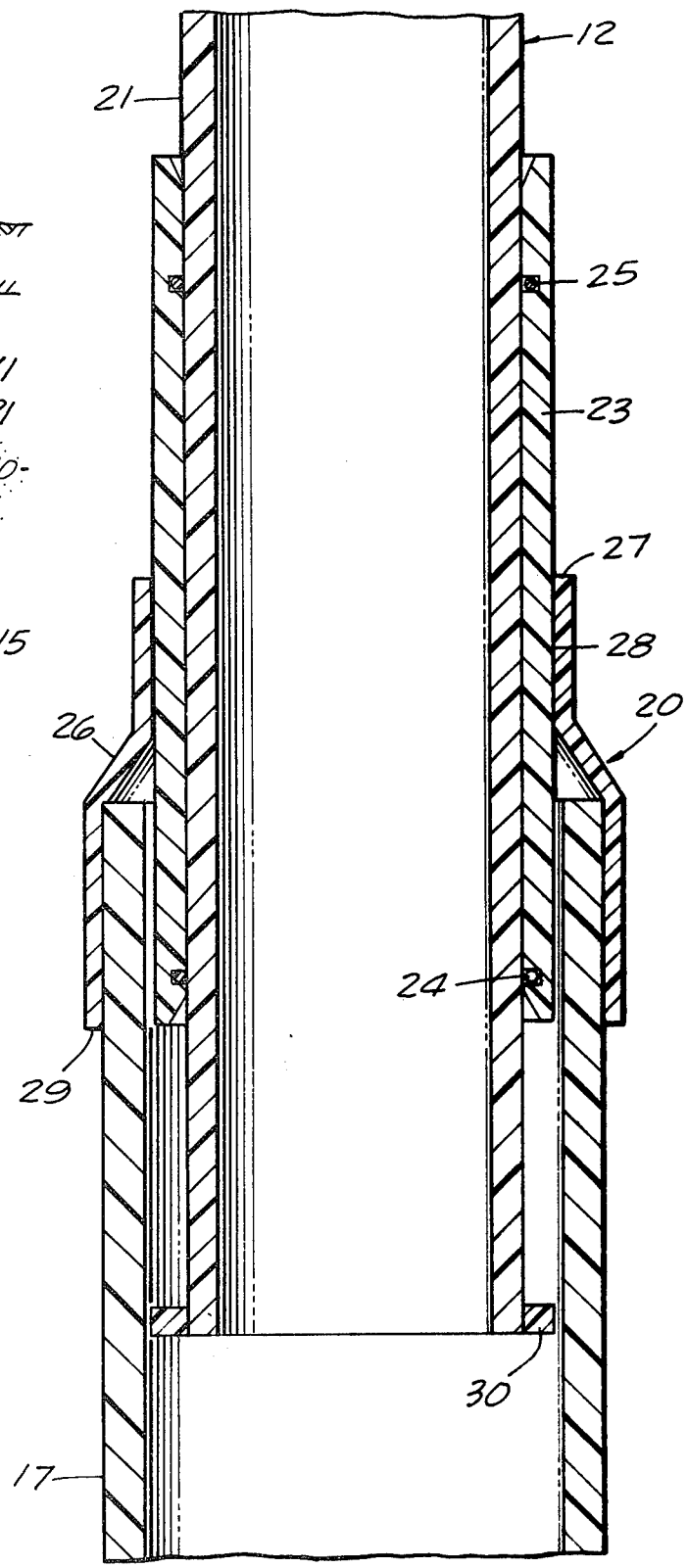
FIG. 2 is an enlarged, sectional, elevational view through a transition joint taken along the line 2—2 of FIG. 1.

For the ensuing detailed description of the tubular gas extracting means 12 reference is additionally made to FIG. 2. A length of pipe 17 having a plurality of vertically extending perforations 18 in its sidewall and arranged completely about the pipe periphery is vertically located within the lower reaches 13 of the well site bore. A cap 19 secured over the lower end of the pipe 17 completely closes off the pipe lower end. As already noted, gravel backfill 13 is loosely packed about the perforated section of the pipe 17 while an imperforate section of the pipe extends through the sealing layer 14 with the upper pipe end terminating in the fine soil fill 15.

Via an expansion fitting 20 to be described, a further section of pipe 21 of smaller diameter than the pipe 17 is interrelated to the upper end of that pipe, and is of such a length as to extend outwardly of the cover soil. A cap 22 is releasably located over the outer end of the pipe. The fine soil backfill 15 in the well site is packed about the pipe 21 to secure it in axial, vertically extending relation as shown in FIG. 1.

As seen best in FIG. 2, the upper pipe 21 is sufficiently smaller than pipe 17 to enable pipe 17 and a closely fitting pipe sleeve 23 to be freely received within the bore of pipe 17. The surface of sleeve 23 includes a pair of circumferential grooves within which O-rings 24 and 25 are received providing a sliding and generally gas-tight seal between the sleeve and outer surface of pipe 21. A hollow cylindrical collar 26 has a small diameter end 27 which is fittingly received onto sleeve 23 and secured thereto by a quantity of suitable cementitious material 28. The collar expands out to a larger diameter end 29 which is spaced sufficiently from the sleeve outer surface as to permit the upper end of pipe 17 to fit therebetween. The lowermost end of pipe 21 has an outwardly extending rim 30, or optionally a "bell-end" pipe may be used, which when brought into contact with the lower end of the sleeve 23 serves as a limit stop to the total amount of subsidence that can be adjustably accommodated by the transition joint.

In operation of the described gas well, gas generated just outwardly of region 13 passes through the gravel and into elongated perforations 18 along pipes 17 and 21 for utilization at the soil surface. On subsidence occurring in 13, this causes the pipe 17, collar 26 and sleeve 23 to move downwardly until supported once again within the gravel fill. On such downward motion the sleeve slides along pipe 21 thereby not imparting any strain to pipe 21 or any surface located equipment interconnected with the pipe.

The pipes 17 and 21, sleeve 23 and collar 26 may be constructed of either metal or plastic (e.g., polyvinylchloride). The O-rings 24 and 25 are made of Buna-N or some other good resistant and flexible material. When the sleeve and collar are metal, then they would preferably be secured together by welding. If the parts are plastic, a suitable solvent or cementitious material 28 would be preferable for securing the collar in place.

I claim:

1. In a gas well having a first pipe with imperforate side walls received within a downwardly extending well bore and a second pipe of larger internal diameter than the external diameter of the first pipe, said second pipe having a plurality of openings in its sidewall and being located within the well bore below the first pipe, the interior of said first and second pipes being in open communication with each other such that gas entering the openings in the second pipe sidewall can move upwardly into the first pipe, the improvement comprising:

a cylindrical sleeve of internal diameter exceeding the diameter of the first pipe slidingly received onto the first pipe;

first and second elastomeric O-ring means located, respectively, within first and second spaced apart grooves on the sleeve inner wall for forming a sliding gas seal between said sleeve and first pipe;

an outwardly extending rim unitarily related to the lower end of the first pipe having an outer diameter exceeding the sleeve inner diameter but less than the second pipe inner diameter;

a cylindrical collar having a small diameter end secured to the outer surface of the sleeve and a larger diameter end extending downwardly along said sleeve and forming an open space between the collar and the outer surface of said sleeve; and the upper end of said second pipe being received within the open space between said collar and sleeve and supporting by engaging said collar.

* * * * *